(12) United States Patent
Gurinavičiūtė et al.

(10) Patent No.: US 11,855,996 B1
(45) Date of Patent: *Dec. 26, 2023

(54) SYSTEMS AND METHODS FOR CONTROLLING ACCESS

(71) Applicant: UAB 360 IT, Vilnius (LT)

(72) Inventors: Juta Gurinavičiūtė, Vilnius (LT); Carlos Eliseo Salas Lumbreras, Vilnius (LT)

(73) Assignee: UAB 360 IT, Vilnius (LT)

( * ) Notice: Subject to any disclaimer, the term of this patent is extended or adjusted under 35 U.S.C. 154(b) by 0 days.

This patent is subject to a terminal disclaimer.

(21) Appl. No.: 18/069,349

(22) Filed: Dec. 21, 2022

Related U.S. Application Data

(63) Continuation of application No. 18/083,745, filed on Dec. 19, 2022, now Pat. No. 11,652,823.

(51) Int. Cl.
*H04L 9/40* (2022.01)
*G06F 8/61* (2018.01)

(52) U.S. Cl.
CPC .............. *H04L 63/102* (2013.01); *G06F 8/61* (2013.01); *H04L 63/107* (2013.01); *H04L 63/20* (2013.01)

(58) Field of Classification Search
CPC ..... H04L 63/102; H04L 63/107; H04L 63/20; G06F 8/61
See application file for complete search history.

(56) References Cited

U.S. PATENT DOCUMENTS

| | | | |
|---|---|---|---|
| 9,081,982 B2 * | 7/2015 | Bradley, II | G06F 21/6218 |
| 9,264,419 B1 | 2/2016 | Johansson | |
| 10,044,698 B2 * | 8/2018 | Ducatel | H04L 63/08 |
| 10,050,787 B1 | 8/2018 | Johansson | |
| 10,148,495 B1 | 12/2018 | Oczkowski | |
| 10,366,240 B1 * | 7/2019 | Maman | G06F 21/33 |
| 10,542,030 B2 | 1/2020 | Oberheide | |
| 10,979,848 B1 * | 4/2021 | Palappetty | H04L 67/306 |
| 11,042,506 B2 | 6/2021 | Aksionkin | |
| 2004/0083367 A1 * | 4/2004 | Garg | G06F 21/6218 713/170 |
| 2004/0167984 A1 | 8/2004 | Herrmann | |

(Continued)

OTHER PUBLICATIONS

Notice of Allowance in U.S. Appl. No. 18/083,745 dated Mar. 21, 2023.

*Primary Examiner* — Darren B Schwartz
(74) *Attorney, Agent, or Firm* — Meunier Carlin & Curfman LLC

(57) ABSTRACT

An administrator creates an access policy for a network resource using an access server. The access policy may specify device characteristics that are needed to access the network resource. These characteristics may relate to the type of user device, the computing environment of the user device, installed applications and versions, installed certificates, and physical characteristics. The access policy for the network resource may be assigned to a user or to groups of users. Later, when the user attempts to access the network resource, an application installed on the user device provides a file containing the characteristics of the user device to the access server. The access server determines whether the characteristics of the file satisfies the access policy associated with the user and network resource, and if so permits access to the network resource. Else, access to the network resource is denied.

20 Claims, 5 Drawing Sheets

(56) References Cited

U.S. PATENT DOCUMENTS

| | | | |
|---|---|---|---|
| 2005/0055578 | A1 | 3/2005 | Wright |
| 2009/0227274 | A1* | 9/2009 | Adler .................. H04W 8/18 |
| | | | 455/70 |
| 2011/0087899 | A1 | 4/2011 | Fetik |
| 2012/0102543 | A1* | 4/2012 | Kohli .................. H04L 63/20 |
| | | | 726/1 |
| 2013/0007245 | A1 | 1/2013 | Malik |
| 2013/0268997 | A1 | 10/2013 | Clancy |
| 2013/0312057 | A1 | 11/2013 | Dabbiere |
| 2014/0026195 | A1 | 1/2014 | Marshall |
| 2014/0280955 | A1 | 9/2014 | Stuntebeck |
| 2014/0289833 | A1 | 9/2014 | Briceno |
| 2014/0330945 | A1 | 11/2014 | Dabbiere |
| 2016/0072815 | A1* | 3/2016 | Rieke .................. H04L 63/101 |
| | | | 726/3 |
| 2016/0087956 | A1 | 3/2016 | Maheshwari |
| 2016/0088021 | A1* | 3/2016 | Jayanti Venkata .... H04L 63/104 |
| | | | 726/1 |
| 2016/0094560 | A1 | 3/2016 | Stuntebeck |
| 2016/0182296 | A1 | 6/2016 | Sharp-Paul |
| 2016/0344736 | A1 | 11/2016 | Khait |
| 2017/0048253 | A1* | 2/2017 | Anton .................. H04L 63/20 |
| 2017/0078322 | A1* | 3/2017 | Seiver ................ H04W 84/005 |
| 2017/0118249 | A1 | 4/2017 | Motukuru |
| 2017/0163647 | A1* | 6/2017 | Cernoch ................ G06F 21/44 |
| 2019/0132308 | A1 | 5/2019 | Graham |
| 2019/0230169 | A1 | 7/2019 | Elangovan |
| 2019/0342296 | A1 | 11/2019 | Anandam |
| 2019/0342338 | A1 | 11/2019 | Anandam |
| 2020/0177444 | A1 | 6/2020 | Nelson-Gal |
| 2020/0236114 | A1 | 7/2020 | Patil |
| 2021/0133298 | A1* | 5/2021 | Andrews ................ G06F 21/78 |
| 2021/0312441 | A1* | 10/2021 | Dawson, V ........... H04L 63/105 |

* cited by examiner

SYSTEMS AND METHODS FOR CONTROLLING ACCESS

CROSS-REFERENCE TO RELATED APPLICATIONS

This application is a continuation of U.S. application Ser. No. 18/083,745, titled "SYSTEMS AND METHODS FOR CONTROLLING ACCESS", and filed on Dec. 19, 2022.

BACKGROUND

Controlling access to network resources in a computing environment is an ongoing concern in computer security. Currently, most access control is done at the user account level. For example, an administrator may specify which network resources a particular user account is allowed to access (or not allowed to access). When a user logs into the computing environment using the user account, the user is only allowed to use those network resources to that the user has been provided access by the administrator.

While controlling access based on user accounts is sufficient for many use cases, for some network resources and computing environments, there are drawbacks associated with only controlling access using user accounts. In particular, there is no way to control the type or state of the computing device that users use to access the network resources.

For example, an administrator may desire to provide access to a network file server to an Android software developer. However, the administrator may only desire to provide the Android software developer access using a computing device that runs the Android operating system and not other types of computing devices. In another example, the administrator may desire to allow users to connect to network resources from their home computers but would like to restrict access to home computers that have up-to-date operating systems or that have antivirus software installed.

SUMMARY

In an embodiment, systems, methods, and computer-readable mediums for controlling access to network resources based on user device characteristics. An administrator creates an access policy for a network resource using an access server. The access policy may specify user device characteristics that are needed to access the network resource. These characteristics may relate to the type of computing device (e.g., laptop vs. smartphone), the computing environment of the device (e.g., operating system and version, installed applications and versions), installed certificates, and physical characteristics (e.g., processor type and any connected USB-devices or fobs). The access policy for the network resource may be assigned to an individual user or to groups of users. Later, when the user attempts to access the computing resource, an application installed on the user device provides a file containing the characteristics of the user device to the access server. The access server determines whether the characteristics of the file satisfies the access policy associated with the user and network resource, and if so, permits access to the network resource. Else, access to the network resource is denied.

The systems, methods, and computer-readable mediums for controlling access to network resources provides many advantages over the prior art. By allowing administrators to condition access to network resources on device-specific characteristics such as the presence or absence of certain software applications and version numbers, in addition to other forms of authentication, the security of networks and network resources is increased. In addition, the risk of viruses or other malicious software, being introduced to the network resources by poorly maintained or updated computing devices, is reduced.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying figures, which are incorporated herein and form part of the specification, illustrate systems and methods for controlling access to network resources. Together with the description, the figures further serve to explain the principles of the systems and methods for controlling access to network resources described herein and thereby enable a person skilled in the pertinent art to make and use the systems and methods for controlling access to network resources.

DETAILED DESCRIPTION

Figure 1:
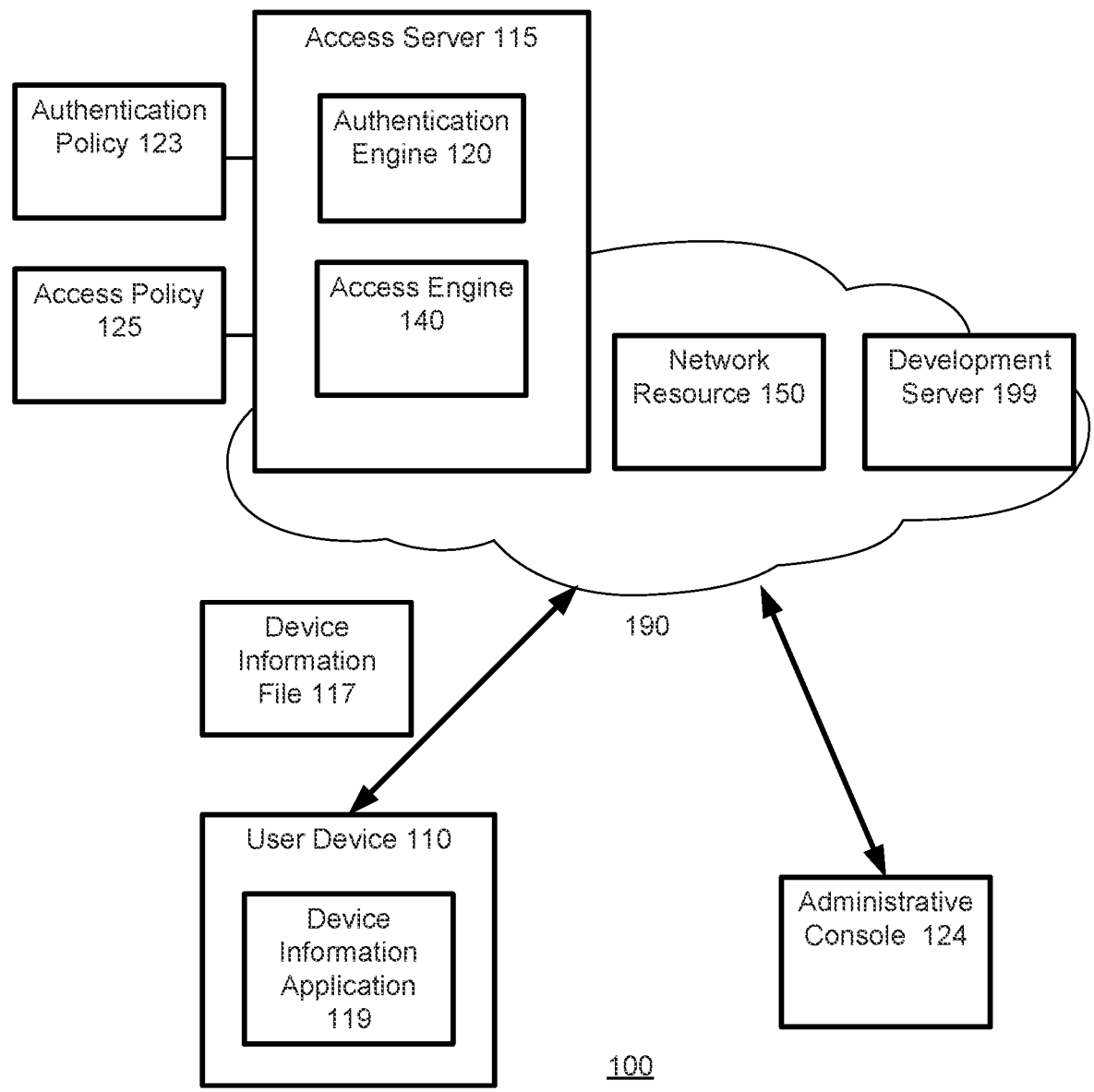
FIG. 1 is an example environment for controlling access to a network resource using access policies.

FIG. 1 is an example environment for controlling access to a network resource using access policies. As shown, the environment 100 includes an access server 115, and an administrative console 124, in communication with one or more user devices 110 through a network 190. The network 190 may include a combination of public and private networks. Each of the access server 115, administrative console 124, and user devices 110 may be implemented using one or more general purpose computing devices such as the computing device 500 illustrated with respect to FIG. 5. Moreover, in some embodiments, the access server 115 may be implemented in a cloud-based computing environment.

The access server 115 may include several components including, but not limited to, an authentication engine 120, and an access engine 140. More or fewer components may be supported.

The access server 115 may control access to one or more network resources 150 available on the network 190. These network resources 150 may include, but are not limited to applications, application programming interfaces, files and directories, databases, and websites. In addition, the network resources 150 may include devices such as printers, scanners, and media devices. Other types of network resources 150 may be supported.

The access server 115 may control access to network resources 150 based on one or more of authentication policies 123 and access policies 125. The authentication engine 120 may allow an administrator (using the administrative console 124) to create an authentication policy 123. As used herein an authentication policy 123 may describe the process and types of credentials that may be provided by a user to connect to the network 190 or a network resource 150. Example authentication policies 123 include a password-based login, multi-factor authentication, token-based authentication, or certificate-based authentication. Other types of authentication policies 123 may be supported.

An administrator may use the authentication engine 120 to create an authentication policy 123 for a user. Depending on the embodiment, the administrator may use a graphical user interface ("GUI") provided by the authentication engine 120 or administrative console 124 to select a user account associated with the user. The administrator may then select the type of authentication that the user should receive when connecting to the network 190 or a network resource 150, and the authentication engine 120 may then create an authentication policy 123 based on the selected user account and type of authentication.

In some embodiments, rather than select a single user account, the administrator may select groups of user accounts, and may select an authentication type to apply to all of the user accounts in the group. The authentication engine 120 may then create an authentication policy 123 that applies to all of the members of the group. The members of a group may correspond to members of a particular team or organization controlled by the administrator.

The authentication policies 123 may include different types of authentication for different network resources 150. For example, for a network resource 150 such as read access to a file server, the authentication policy 123 may only require that the user provide a single password. For a network resource 150 such as the use of a particular application, the authentication policy 123 may require that the user be authenticated using multi-factor authentication.

The administrator may use the access engine 140 to create one or more access policies 125 that control access to network resources 150 based on characteristics of user devices 110 that are used to access the network resources 150. Characteristics of user devices 110 as used herein may include hardware characteristics and/or computing environment characteristics. Other types of characteristics may be supported.

Hardware characteristics of a user device may relate to the type and capabilities of the user device. Example hardware characteristics may include the type of user device 110 (e.g., laptop, desktop, smartphone or tablet), manufacturer of the user device 110 (e.g., Apple, Lenovo, or Dell), peripheral devices available on the user device 110 (e.g., camera, fingerprint scanner, etc.), and computing capabilities of the user device 110 (e.g., processor type and speed, and amount of memory). The computing environment characteristics may include the operations system and version number, installed applications and version numbers, and any installed certificates. Other characteristics may include authentication related characteristic such as whether or not the user of the user device authenticated themselves using a fingerprint scanner or other biometric device of the user device 110, or whether or not a required fob or USB device is inserted into the user device 110.

The access policies 125 may also include characteristics related to the location (e.g., city, state, or country of where the user device 110 is located) of the user device 110 and a current time (e.g., the time when the user device 110 is requesting access to the network resource 150).

The access policies 125 may include both positive characteristics and negative characteristics. A positive characteristic is a characteristic that must be present in the user device 110 for the user device 110 to connect to the network resource 150. A negative characteristic is a characteristic that must not be present in the user device 110 for the user device 110 to connect to the network resource 150. For example, an access policy 125 may have a positive characteristic of anti-malware software, and only user devices 110 with anti-malware software installed will satisfy the access policy 125. In contrast, an access policy 125 may have a negative characteristic of not being located in a country such as North Korea, and only user devices 110 with locations other than North Korea will satisfy the access policy 125.

The administrator may use the access engine 140 to create an access policy 125 for one or more network resources 150 and users. Like the authentication engine 120, the administrator may use a GUI provided by the access engine 140 to select a network resource 150. The administrator may then select the characteristics required by a user device 110 to access the selected network resource.

For example, for a network resource 150 such as access to a database, the administrator may specify that the user device 110 has at least a certain version of a particular operating system, and at least one antivirus application installed. Where multiple operating systems are supported (e.g., iOS, Android, Windows, or Linux), the administrator may specify the minimum version number for each operating system.

In another example, a network resource 150 such as a development server 199 may be deployed for use by a particular team of developers. Because the developers are provided company computers, the administrator may select hardware characteristics such as the make and model of a user device 110 that was provided to each developer. Because the developers are in Portugal, the administrator may select location characteristics that the user device 110 be in Portugal and time characteristics that the developers are connecting to the network resource 150 during working hours (e.g., positive characteristic) or are otherwise not connecting during designated non-working hours (e.g., negative characteristic).

After selecting the characteristics for an access policy 125, the access engine 140 may construct the access policy 125 based on the selected characteristics. The administrator may then select the users, or groups of users, that the generated access policy 125 for the network resource 150 will apply to. Where groups of users are selected, the groups may correspond to teams or entire organizations.

Continuing the examples described above, for the access policy 125 related to the database network resource 150, the administrator may select all the users associated with the organization for the access policy 125 to apply to. For the access policy 125 related to the development server, the administrator may select the users associated with the development team for the access policy 125 to apply to.

In order to enforce the access policies 125 associated with the network resources 150, in some embodiments, each user device 110 that accesses a network resource 150 may have a device information application 119 installed on the user device 110. The device information application 119 installed on a user device 110 may collect characteristics of the user device 110 and may use the collected characteristics to construct a device information file 117. The device information application 119 may provide the file 117 to the access engine 140. The access engine 140 may use the characteristics in the file 117 to determine if the user device 110 complies with the access policy 125 associated with the network resource 150. In some embodiments, the device information application 119 may collect some of the characteristics using low privilege operating system commands supported by the user device 110. Other methods for collecting the characteristics may be supported.

When a user device 110 connects to a network resource 150 of a network 190, the authentication policy 123 may first authenticate the associated user using one or more authentication policies 123. The authentication policy 123 that is used to authenticate the user may be associated with the user account of the user, or may be associated with any teams that the user account is a member of. Where multiple authentications policies 123 apply to a user, the most restrictive authentication policy 123 may be used.

Once the user of the user device 110 is authenticated, the access engine 140 may determine the access policy 125 or policies 125 that apply to the user, the user device 110, and/or the network resource 150. Depending on the embodiment, an access policy 125 for the network resource 150 may apply to the user if the access policy 125 is associated with the user account of the user or is associated with a group or organization that the user account is a member of.

Before or after determining the applicable access policies 125, the access engine 140 may request the device information file 117 from the device information application 119. The device information application 119 may receive the request, collect the hardware characteristics, computing environment characteristics, location information, and time information for the device information file 117, and provide the device information file 117 to the access engine 140 through the network 190. In some embodiments rather than wait for the access engine 140 to request the device information file 117, the device information application 119 may generate and send the device information file 117 at around the same time that the user device 110 sent the request to access the network resource 150.

In some embodiments, before the device information application 119 sends the device information file 117 the user of the user device 110 may consent to collection of the information that is used to create the device information file 117. The consent may be received from the user at the time when the user installs the device information application 119 or may be received from the user before the device information file 117 is created and sent to the access engine 140. Any method for requesting and receiving consent from a user may be used.

In some embodiments, the device information file 117 sent by the device information application 119 to the access engine 140 may be a complete file 117 and may include all of the information and characteristic of the user device 110 that could be used in a particular access policy 125. Alternatively, the information in the device information file 117 may be narrowly tailored to include just the information needed by the access engine 140 to determine if the user device 110 is compliant with the access policy 125 associated with the user, the user device 110, and/or the requested network resource 150.

For example, an access policy 125 for a network resource 150 and a user may specify that user device 110 has installed a current version of anti-virus software. Accordingly, when the access engine 140 requests the device information file 117 from the device information application 119, the access engine 140 may request only the characteristics related to the anti-virus applications installed on the user device 110. The device information application 119 may then generate and send a device information file 117 with the requested characteristics of the anti-virus applications installed on the user device 110, if any.

After receiving the device information file 117, the access engine 140 may determine if the user device 110 complies with the one or more access policies 125 associated with the requested network resource 150 and the user account associated with the user of the user device 110. The access engine 140 may determine compliance, or non-compliance, by comparing the various characteristics and other information specified by the one or more access policies 125 with the characteristics and information in the device information file 117. If the characteristics and information in the device information file 117 satisfy each of the one or more access policies 125 then the access engine 140 may allow the user to access the network resource 150 using the user device 110. Else, the access engine 140 may deny the user device 110 access to the network resource 150.

Where the access engine 140 denies access to a network resource 150, in some embodiments, the access engine 140 may provide an explanation of why the user device 110 was denied access. The explanation may be provided in a message that is displayed to the user of the user device 110, or the user device 110 may be redirected to a webpage or other document that includes the explanation.

For example, if a user device 110 was rejected for being non-compliant with an access policy 125 that required the user device 110 to have the Chrome web browser, the access engine 140 may provide a message to the user of the user device 110 that explains how a user device 110 with the Chrome web browser is necessary to use the network resource 150. The message may include a link to where the Chrome web browser can be downloaded to the user device 110 to become compliant with the access policy 125.

As described above, a user may have an associated user account and may be a member of one or more groups of users. These groups may correspond to teams or an entire organization. Each group of users may be associated with different access policies 125 for a network resource 150. Accordingly, a user may have several access policies 125 associated with them for a network resource 150. These may include the access policy 125 associated with the user account of the user, an access policy associated with the team or teams that the user is a member of, and an access policy 125 associated with the organization that the user belongs to.

When multiple access polices 125 apply to a network resource 150 for a user, the access engine 140 may first determine whether the user device is in compliance with the user account specific access policy 125 before determining compliance with the other access policies 125. If the user is compliant with the access policy 125 specific to the user the access engine 140 may consider any team specific access policy 125, followed by any organization specific access policy 125. Where there are conflicts between access policies 125 the more specific access policy 125 may control access to the network resource 150. Alternatively, the more restrictive access policy 125 may control access to the network resource 150.

In some embodiments, after a user device 110 is permitted to access a network resource 150, the access engine 140 may periodically re-request the device information file 117 from the device information application 119 on the user device 110. The access engine 140 may then redetermine whether or not the user device 110 still complies with the one or more access policies 125. For example, a network resource 150 may have an access policy 150 for a user that requires the user to have a certain application installed on their user device 110. After connecting to the network resource 150, the user may remove or uninstall the application from their user device 110, making them non-compliant with the one or more access policies 125. By periodically requesting and checking the device information files 117, such a non-compliant user device 110 may be detected and access to the network resource 150 may be withdrawn.

In some embodiments, the frequency with which the access engine 140 rechecks the device information file 117 for compliance with the one or more access policies 125 may be set by a user or administrator. As may be appreciated, high value or high risk network resources 150 may have higher frequencies than low value or low risk network resources 150.

Figure 2:
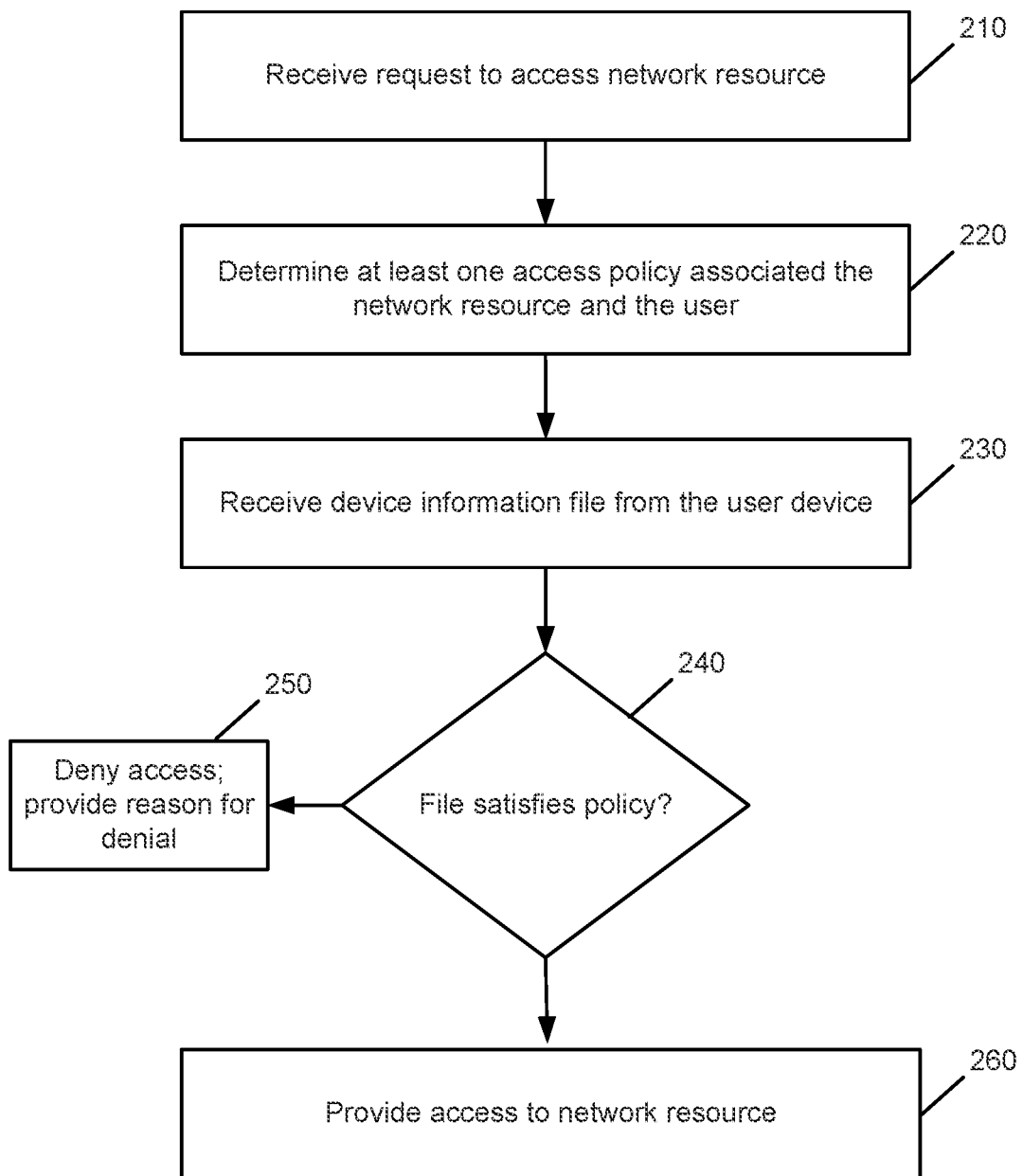
FIG. 2 is an example method for controlling access to a network resource using access policies.

FIG. 2 is an example method for controlling access to a network resource using access policies. The method 200 may be implemented by the access server 115. The method 200 may be implemented before or after the access server 115 authenticates the user of the user device 110 with the authentication engine 120.

At 210, a request to access a network resource 150 is received. The request may be received by the access server 115 from a user device 110. The network resource 150 may be one of many network resources 150 available on a network 190 associated with an organization that the user of the user device 110 is a member of. Examples of network resources 150 include applications, databases, devices, files and general access to the network 190 itself.

At 220, at least one access policy 125 associated with the network resource 150 and the user is determined. The at least one access policy 125 may be determined by the access engine 140. The at least one access policy 125 may define characteristics of the user device 110 that are required for the user device 110 to be permitted to access the network resource 150. The characteristics may relate to the physical hardware of the user device 110, a computing environment associated with the user device 110, and a location of the user device 110. Other characteristics and information may be included in the access policy 125. The at least one access policy 125 may be associated with a user account of the user or may be associated with a group that the user account is a member of.

At 230, a device information file is received. The device information file 117 may be received by the access engine 140 from a device information application 119 installed on the user device 110. The device information file 117 may include characteristics of the user device 110 such as the type of the device 110, processing or memory capabilities of the device 110, an operating system and version number used by the device 110, a list of applications and version numbers installed on the device 110, and a current location of the device 110. Other information or characteristics of the user device 110 may be included in the device information file 117.

At 240, whether the device information file 117 satisfies the at least one access policy is determined. The determination may be made by the access engine 140 using the at least one access policy 125 and the device information file 117. If it is determined that the device information file 117 does satisfy the at least one access policy 125, the method 200 may continue at 260. If the device information file 117 does not satisfy the at least one access policy 125, the method may continue at 250.

At 250, the user device is denied access to the network resource. The access may be denied by the access engine 140. Depending on the embodiment, the access engine 140 may provide one or more reasons for the access denial to the user device 110. The reasons may indicate the particular characteristic(s) of the access policy 125 that were not present on the user device 110, for example.

At 260, the user device is allowed to access the network resource. The user device 110 may be allowed to access the network resource 150 by the access engine 140. In some embodiments, after some period of time elapses, the method 200 may return to 230 where a new device information file 117 is received for the user device 110 and the compliance with the at least one access policy 125 is reassessed. The period of time may be set by an administrator or may be specified in the at least one access policy 125.

Figure 3:
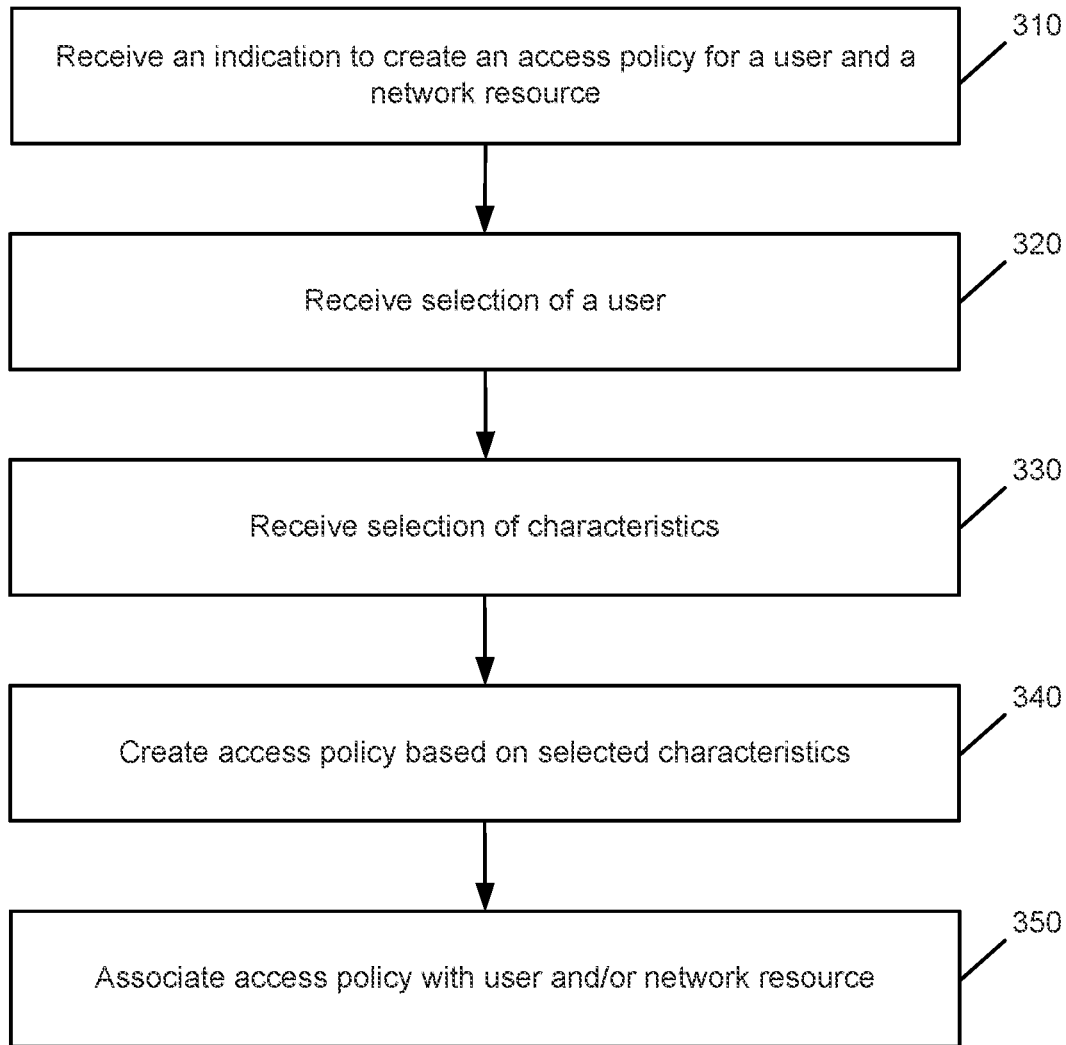
FIG. 3 is an illustration of an example method for creating an access policy.

FIG. 3 is an illustration of an example method for creating an access policy. The method 300 may be implemented by the access server 115.

At 310, an indication to create an access policy 125 for a network resource 150 is received. The indication may be received by the access engine 140 from an organization associated with the network resource 150. Depending on the embodiment, the indication may be received through a GUI associated with the access engine 140. For example, the administrator may select the network resource 150 in the GUI.

At 320, a selection of a user is received. The selection of a user may be received by the access engine 140 from the administrator. In some embodiments, the administrator may select the user by selecting a user account associated with the user in the GUI. In some implementations, a user is not selected for the access policy 125. In such implementations, the access policy 125 applies to all users requesting access to the network resource 150.

At 330, a selection of one or more characteristics is received. The selection may be received from the administrator by the access engine 140 through the GUI. The characteristics may be characteristics that a user device 110 should have to connect to the network resource 150. The characteristics may include characteristics related to the type of user device 110, the location of the user device 110, and the computing environment associated with the user device 110. For example, the selected characteristics may indicate one or more applications that may be installed on the user device 110 to connect to the network resource 150, or may indicate the acceptable browsers and operating systems that may be installed in the user device 110 to connect to the network resource 150.

At 340, the access policy 125 is created based on the selected characteristics. The access policy 125 may be created by the access engine 140 of the access server 115.

At 350, the access policy is associated with the user and/or the network resource 150. The access policy 125 may be associated with the user and the network resource 150 by the access engine 140.

Figure 4:
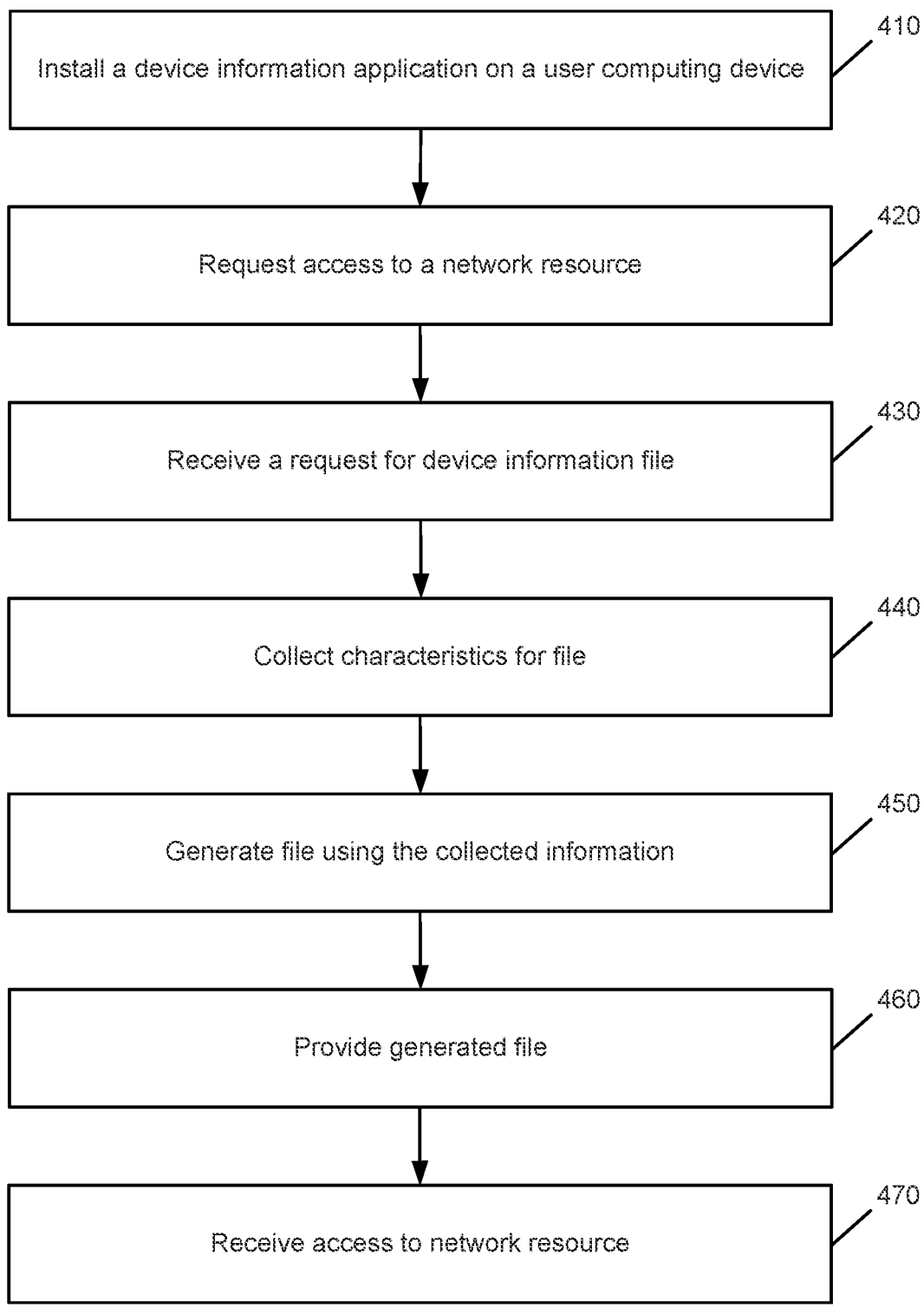
FIG. 4 is an illustration of an example method for using a device information application to control access to a network resource.

FIG. 4 is an illustration of an example method for using a device information application to control access to the network resource 150. The method 400 may be implemented by the access server 115 and the user device 110.

At 410, the device information application 119 is installed on the user device 110. The device information application 119 may be installed on a user device by a user associated with the device 110. Installing the application 119 may be a condition on connecting to one or more network resources 150 associated with a network 190 and an organization. The user may install the application 119 by downloading the application 119 from the organization or through an app store or application marketplace and/or accessing a website hosted by or associated with the access server 115.

At 420, access to the network resource 150 is requested. The user may use the user device 110 to request access to the network resource 150. The user may request access to the network resource 150 from the access server 115.

At 430, a request for the device information file 117 is received. The request for the device information file 117 may be received by the device information application 119 from the access engine 140.

At 440, characteristics are collected for the device information file 117. The characteristics may be characteristics related to user device 110 and may be collected by the device information application 119. The characteristics may include characteristics about the hardware or type of the user device 110, characteristics about a computing environment of the user device 110 including indications of installed applications, a location of the user device 110, and/or a time associated with the user device 110. The characteristics may further include the presence (or absence) of a specific file, certificate, or token on the user device 110, for example.

In some implementations, the request at 430 may be omitted. In such implementations, the device information application 119 may collect the characteristics for the device information file automatically, periodically, and/or in response to a request for the network resource 150.

At 450, the device information file 117 is generated. The device information application 119 may generate the device information file 117 using the collected information from the user device 110.

At 460, the generated device information file 117 is provided. The generated device information file 117 may be provided by the device information application 119 to the access engine 140. The access engine 140 may then use the device information file 117 to determine whether the user device 110 complies with an access policy 125 associated with the requested network resource 150 and the user associated with the user device 110.

At 470, access to the network resource 150 is provided. The access to the network resource 150 is provided by the access engine 140 to the user device 110. The access engine 140 may have determined that the device information file 117 of the user device 110 complied with the access policy 125.

Figure 5:
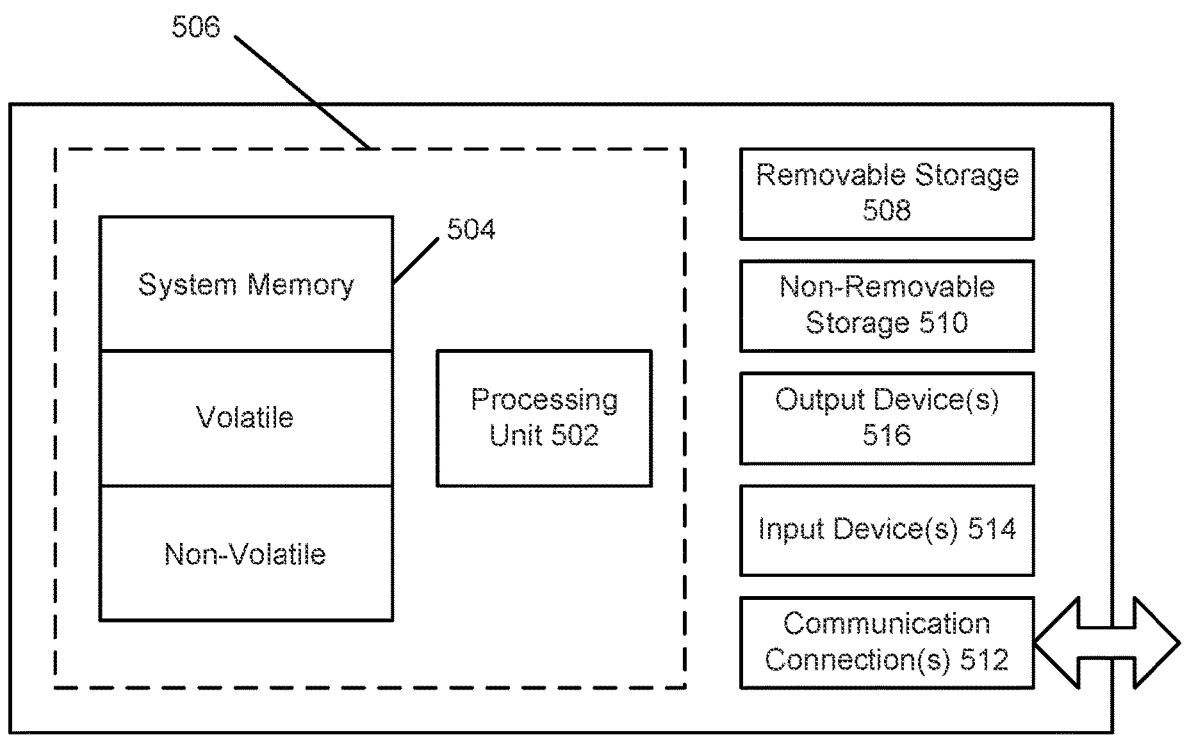
FIG. 5 shows an exemplary computing environment in which example embodiments and aspects may be implemented.

FIG. 5 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/ functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by the device 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communication connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for controlling access to network resources:
   installing a device information application on a user device associated with a user;
   requesting access to a network resource associated with a server from the user device through a network;
   collecting characteristics of the user device by the device information application;
   generating a device information file by the device information application using the characteristics of the user device by the device information application;
   providing the device information file to the server by the device information application;
   receiving access to the network resource by the user device, wherein the access is based on a comparison of the device information file to an access policy associated with the user and/or the network resource;
   receiving a request for a new device information file by the device information application after an amount of time has elapsed since the user device received access to the network resource;
   in response to the request, generating the new device information file by the device information application using the characteristics of the user device by the device information application; and
   providing the device information file to the server by the device information application.

2. The method of claim 1, further comprising receiving a request for the device information file from the server device by the device information application through the network.

3. The method of claim 1, wherein the characteristics of the user device comprises one or more of characteristics of an operating system installed on the user device, characteristics of one or more applications installed on the user device, characteristics of one or more certificates installed on the user device, a time, and a location of the user device.

4. The method of claim 3, wherein the characteristics of the operating system include a type and a version number of the operating system.

5. The method of claim 3, wherein the characteristics of the one or more applications include information about an antivirus application installed on the user device.

6. The method of claim 1, wherein the device information file includes a current location of the user device.

7. The method of claim 1, further comprising:
   receiving a denial of access to the network resource, wherein the denial identifies at least one application not installed on the user device;
   installing the at least one application; and
   receiving access to the network resource.

8. The method of claim 1, further comprising:
   receiving a denial of access to the network resource, wherein the denial identifies a version number of at least one application installed on the user device;
   upgrading the at least one application to the identified version number; and
   receiving access to the network resource.

9. A system for controlling access to users and user devices comprising:
   at least one processor; and
   a non-transitory computer-readable medium with computer-executable instructions stored thereon that when executed by the at least one processor cause the system to:
   install a device information application on a user device associated with a user;
   receive a request for access to a network resource associated with the system from the user device through a network;
   collect characteristics of the user device using the device information application;
   generate a device information file using the device information application from the characteristics of the user device;
   receive the device information file from the device information application;
   provide the user device access to the network resource, wherein the access is based on a comparison of the device information file to an access policy associated with the user and/or the network resources;
   receive a request for a new device information file after an amount of time has elapsed since the user device received access to the network resource;
   in response to the request, generate the new device information file using the characteristics of the user device; and
   provide the device information file.

10. The system of claim 9, further comprising computer-executable instructions that when executed by the at least one processor cause the system to request the device information file from the device information application.

11. The system of claim 9, wherein the characteristics of the user device comprises one or more of characteristics of an operating system installed on the user device, characteristics of one or more applications installed on the user device, characteristics of one or more certificates installed on the user device, a time, and a location of the user device.

12. The system of claim 11, wherein the characteristics of the operating system include a type and a version number of the operating system.

13. The system of claim 11, wherein the characteristics of the one or more applications include information about an antivirus application installed on the user device.

14. The system of claim 9, wherein the device information file includes a current location of the user device.

15. The system of claim 9, further comprising computer-executable instructions that when executed by the at least one processor cause the system to:

provide a denial of access to the network resource to the user device, wherein the denial identifies at least one application not installed on the user device;

determine that the at least one application has been installed on the user device; and provide access to the network resource to the user device in response to the determination.

16. The system of claim 9, further comprising computer-executable instructions that when executed by the at least one processor cause the system to:

provide a denial of access to the network resource to the user device, wherein the denial identifies a version number of at least one application installed on the user device;

determine that the at least one application has been upgraded to the identified version number on the user device; and provide access to the network resource to the user device in response to the determination.

17. A non-transitory computer-readable medium with computer-executable instructions stored thereon that when executed by the at least one processor cause a system to:

install a device information application on a user device associated with a user;

receive a request for access to a network resource associated with the system from the user device through a network;

collect characteristics of the user device using the device information application;

generate a device information file using the device information application from the characteristics of the user device;

receive the device information file from the device information application;

provide the user device access to the network resource, wherein the access is based on a comparison of the device information file to an access policy associated with the user and/or the network resource receive a request for a new device information file after an amount of time has elapsed since the user device received access to the network resource;

in response to the request, generate the new device information file using the characteristics of the user device; and provide the new device information file.

18. The computer-readable medium of claim 17, further comprising computer-executable instructions that when executed by the at least one processor cause the system to request the device information file from the device information application.

19. The computer-readable medium of claim 17, wherein the characteristics of the user device comprises one or more of characteristics of an operating system installed on the user device, characteristics of one or more applications installed on the user device, characteristics of one or more certificates installed on the user device, a time, and a location of the user device.

20. The computer-readable medium of claim 19, wherein the characteristics of the operating system include a type and a version number of the operating system.

* * * * *